(12) United States Patent
LeFave

(10) Patent No.: US 6,872,767 B1
(45) Date of Patent: *Mar. 29, 2005

(54) METHOD OF PROTECTING SURFACES WITH ALUMINUM FLAKED COMPOSITION

(75) Inventor: Jacques T. LeFave, Jean, NV (US)

(73) Assignee: Rust Bullett, LLC, Reno, NV (US)

( * ) Notice: Subject to any disclaimer, the term of this patent is extended or adjusted under 35 U.S.C. 154(b) by 10 days.

This patent is subject to a terminal disclaimer.

(21) Appl. No.: 10/295,663

(22) Filed: Nov. 14, 2002

(51) Int. Cl.$^7$ .............................................. C09K 3/08
(52) U.S. Cl. ....................................... 524/441; 524/789
(58) Field of Search ................................. 524/441, 786

(56) References Cited

U.S. PATENT DOCUMENTS

| | | | |
|---|---|---|---|
| 4,098,844 A | 7/1978 | Tsugukuni et al. | 260/859 R |
| 4,199,489 A * | 4/1980 | Short | 524/786 |
| 4,279,962 A | 7/1981 | Meyer et al. | 428/332 |
| 4,383,070 A * | 5/1983 | Markusch et al. | 524/317 |
| 4,484,951 A | 11/1984 | Uchimura et al. | 106/290 |
| 4,567,230 A * | 1/1986 | Meyer et al. | 524/786 |
| 4,657,953 A * | 4/1987 | Kojo et al. | 523/435 |
| 4,857,623 A | 8/1989 | Emmerling et al. | 528/28 |
| 5,081,203 A | 1/1992 | Pedain et al. | 528/49 |
| 5,179,187 A | 1/1993 | Pedain et al. | 528/59 |
| 5,372,638 A | 12/1994 | DePue et al. | 106/404 |
| 5,389,139 A * | 2/1995 | Carpenter et al. | 106/404 |
| 5,391,686 A | 2/1995 | Jadhav et al. | 528/77 |
| 5,452,716 A | 9/1995 | Clift | 128/633 |
| 5,494,512 A | 2/1996 | Yamamoto et al. | 106/404 |
| 5,494,741 A | 2/1996 | Fekete et al. | 428/331 |
| 5,587,448 A | 12/1996 | Engen | 528/55 |
| 5,589,535 A | 12/1996 | Schwab et al. | 524/591 |
| 5,596,098 A | 1/1997 | Nikles et al. | 544/357 |
| 5,686,136 A | 11/1997 | Nikles et al. | 427/127 |
| 5,695,812 A | 12/1997 | Pritchett | |
| 5,817,732 A | 10/1998 | Asahina et al. | 528/45 |
| 5,931,996 A | 8/1999 | Reisser et al. | 106/404 |
| 5,944,886 A | 8/1999 | Hashizume | 106/404 |
| 5,964,936 A | 10/1999 | Reisser | 106/404 |
| 5,998,532 A | 12/1999 | Urs | 524/507 |
| 6,132,504 A | 10/2000 | Kuntz et al. | 106/404 |
| 6,277,450 B1 | 8/2001 | Katoot et al. | 427/512 |
| RE37,386 E * | 9/2001 | Melby et al. | 528/60 |
| 6,368,669 B1 | 4/2002 | Hughes et al. | 427/385.5 |
| 6,398,861 B1 | 6/2002 | Knox | 106/404 |
| 6,409,814 B1 | 6/2002 | Bosch et al. | 106/404 |
| 6,417,252 B1 | 7/2002 | Hiraoka et al. | 523/406 |
| 2002/0006996 A1 * | 1/2002 | Lane et al. | 524/441 |

OTHER PUBLICATIONS

L. Sung et al., "Effect of Aluminum Flake Orientation on Coating Appearance", *Proceedings of the 79$^{th}$ Annual Meeting Technical Program of the FSCT*, pp. 453–462, Nov. 2001.

* cited by examiner

Primary Examiner—Matthew A. Thexton
(74) Attorney, Agent, or Firm—Quarles & Brady Streich Lang LLP; Barbara J. Luther

(57) ABSTRACT

A method of protecting a surface has the steps of providing a coating material containing sufficient aluminum flakes to provide a physical barrier to corrosion; and applying the coating material to a surface, thereby protecting the surface with an armor of aluminum. The method provides a coating material comprising about 3% to about 25% by weight of aluminum flakes, about 5% to about 20% by weight of aluminum flakes and about 7% to about 15% by weight of aluminum flakes. The aluminum flakes in the coating material can be non-leafing. A method of treating old concrete and rusting rebar, calls for providing a coating material containing sufficient aluminum flakes to provide a physical barrier to corrosion and polyisocyanates with sufficient unreacted NCO groups to scavenge water and provide a water-tight coating; and applying the coating material to the surfaces of damaged concrete and exposed rebar, thereby protecting the surfaces with an armor of aluminum. A method of restoring bridges whose zinc chromate paint needs to be repaired calls for providing a coating material containing sufficient aluminum flakes to provide a physical barrier to corrosion and polyisocyanates with sufficient unreacted NCO groups to scavenge water and provide a water-tight coating; and applying the coating material to the zinc chromate surface.

9 Claims, No Drawings

METHOD OF PROTECTING SURFACES WITH ALUMINUM FLAKED COMPOSITION

RELATED APPLICATIONS

This application is related to application Ser. No. 10/295,204 filed on the same date as this application, entitled "Improved method of Protecting Surfaces from Corrosion" by inventor Jacques T. LeFave.

BACKGROUND

1. Technical Field

The present invention relates to a process for protecting surfaces by applying a composition which has a relatively high content of aluminum flakes.

2. Prior Art

Aluminum pigments are used widely in coatings as special-effect pigments. The term special-effect pigments is used to denote pigments which have a directed reflection at oriented, metallic or highly light-refractive particles of a predominantly flat configuration. They are always of plate-like or flake-like configuration and have very large particle diameters compared with dye pigments. Depending on transparency, absorption, thickness, single-layer or multi-layer structure, the special-effect pigments exhibit a metallic shine, a pearl shine, interference or interference reflection. The main areas of use are in the cosmetics and automobile sectors, in addition in coloring plastic materials, paints, leather coatings, in printing and ceramics.

While aluminum flake and powder pigments have been used to create eye-pleasing visual effects, no one has taken advantage of the possibility of utilization of the aluminum flakes as mechanical or UV protection.

SUMMARY OF THE INVENTION

The method of the instant invention provides coating with an aluminum flake based coating which provides mechanical and UV protection. In one embodiment, there is a method of protecting a surface which has the steps of providing a coating material containing sufficient aluminum flakes to provide a physical barrier to corrosion; and applying the coating material to a metallic surface, thereby protecting the surface with an armor of aluminum. The method produces a coating material comprising about 3% to about 25% by weight of aluminum flakes, about 5% to about 20% by weight of aluminum flakes and about 7% to about 15% by weight of aluminum flakes. The aluminum flakes in the coating material can be non-leafing.

In another embodiment, a method of treating old concrete and rusting rebar calls for providing a coating material containing sufficient aluminum flakes to provide a physical barrier to corrosion and polyisocyanates with sufficient unreacted NCO groups to scavenge water and provide a water-tight coating; and applying the coating material to the surfaces of damaged concrete and exposed rebar, thereby protecting the surfaces with an armor of aluminum.

In yet another embodiment, a method of restoring bridges whose zinc chromate paint needs to be repaired calls for providing a coating material containing sufficient aluminum flakes to provide a physical barrier to corrosion and polyisocyanates with sufficient unreacted NCO groups to scavenge water and provide a water-tight coating; and applying the coating material to the zinc chromate surface.

These and other features, aspects and advantages of the present invention will become better understood with reference to the following description and appended claims.

DETAILED DESCRIPTION OF A PREFERRED EMBODIMENT

I have discovered that a high concentration of aluminum flake pigment provides an optical and mechanical barrier to the progress of ultraviolet light, moisture, oxygen and other corrosive and erosive effects of environmental agents. The property of some aluminum flake pigments to overlay "leaf upon leaf" provides a nearly impenetrable barrier to ultraviolet light (UV) degradation or chemical contamination of the coated surface. When concentrated in the paint film at a high level, such as between about 3% and about 25% by weight of the coating material and between about 10% and about 90% of the dried film, the flakes can act as a physical barrier to corrosion. The flakes lay flat and form an interlocking scale-like structure that resists abrasion and forms an intricate interlocking matrix that makes it difficult for corrosive agents to pass through to the substrate underneath.

The Al matrix also protects the underlying paint from ultraviolet light, which also adds to the paint's overall effectiveness. The exposed surface of the Al-flake paint may yellow due to UV light, but can be easily painted over with the desired final color.

It has been found that the Al-flake paint of the present invention can be used to restore rusted cars. There it is used as a primer coat where the Al-flake paint scavenges water out of rust and seals the surface from moisture and oxygen, thereby arresting further rusting. The primer is then covered with the desired final color.

In another embodiment, it has been discovered that the inventive Al-flake paint can be used to overcoat the zinc chromate paint and other zinc-rich paints frequently used on bridges and other outdoor structures. Currently in repainting bridges, the zinc chromate paint is first sanded off by sand blasting or other mechanical removal methods. This creates a toxic zinc powder, which must be reclaimed before it falls in the water and harms aquatic life. The inventive Al-flake pigment can be applied directly over the aging zinc chromate or zinc-rich paint, thus saving both sanding and reclamation costs. The inventive Al-flake paint has been shown to bond well to the zinc-based paint and underlying steel.

In another embodiment, the inventive Al-flake paint can be applied to crumbling concrete and rusting rebar. New concrete has been found to bond to the Al-flake paint.

In one embodiment, the Al-flake paint comprises a solution of an Al-flake paste, polyisocyanate mixture, thickener gel and solvents. The thickener comprises swellable clay, molecular sieves mixed with solvents.

The Al-flake component may be leafing or non-leafing. Leafing Al pigments orient at or near the film surface. Non-leafing Al pigments are preferred as they are distributed evenly throughout the entire film. Al-flake pigments are available from several suppliers, including but not limited to Toyal America (Naperville, Ill.), US Aluminum (Haskell, N.J.), Eckart America (Louisville, Ky.), Alcoa (Leetsville, Pa.), Alcan (Benton, Ky.) and Silberline Manufacturing Co. (Tamaqua, Pa.). An example of a suitable Al-flake pigment is Lansford-243 aluminum paste (Silberline), which is described as being 60–80% Al flakes and the remainder being two solvents: Stoddard solvent and an aromatic solvent. Another non-leafing Al flake pigment is Sparkle Silver 5245 AR paste from Silberline.

There have been efforts to develop Al-flake pigments in a variety of colors. U.S. Pat. No. 4,328,042 describes the production of gold-colored Al pigments by deposition of iron oxide. U.S. Pat. No. 5,037,475 describes the production of Al pigments by fixing color pigments on the metal surface. WO 91/04293 describes the coloring of Al pigments by fixing poly-coated color pigments by electrostatic forces. EP-A-0 328 906 discloses titanium dioxide-coated metal pigments produced by hydrolysis of an organic titanate ester compound in the presence of the metal flakes suspended in an organic medium. U.S. Pat. No. 4,978,394 describes the production of titanium dioxide-coated Al pigments by chemical vapor deposition. U.S. Pat. No. 4,158,074 discloses the production of colored Al pigments by coating with a film comprising hydrated Al oxide and hydrated metal oxide for the production of gold, black-brown and gray-white pigments. U.S. Pat. No. 5,931,996 discloses colored Al pigments comprising Al flakes, which are coated with a metal oxide layer, and mixed with ground color pigment in the presence of a solvent. Examples of colors are red, gold and blue.

The polyisocyanate mixtures preferably used in accordance with the invention are reaction products of low molecular weight distillable diisocyanates. Typical representatives of aromatic diisocyanates are 2,4- and 2,6-toluene diisocyanate, more especially in the form of a technical grade mixture; phenylene diisocyanate, 4,4'-diphenyl diisocyanate, 1,5-naphthalene diisocyanate, 4,4'-diphenylmethane diisocyanate, 3,3'-dimethoxy-4,4'-diphenyl diisocyanate, and xylylene diisocyanate. Other similar aromatic diisocyanates also may be used.

One example of such an isocyanate mixture is Desmodur E-28 polyisocyanate resin (Bayer, Pittsburgh, Pa.), which is a polyisocyanate prepolymer based on diphenylmethane diisocyanate (MDI). It has an reactive cyano (NCO) content in the range of about 15.5% to about 17.5%. Desmodur E-28 polyisocyanate resin is readily soluble in esters, ketones and aromatic solvents. Only dry solvents and pigments should be used with Desmodur E-28 polyisocyanate resin. The MSDS for the mixture lists polyisocyanate based on MDI at approximately 76%; 4,4'-diphenylmethane diisocyanate (MDI) at approximately 22%; and diphenylmethane diisocyanate (MDI) at approximately 1.4%. Another supplier of isocyanate mixtures is Huntsman Corporation (West Deptford, N.J.).

It may be desirable to include small amounts of rheology control agents, for example fumed silicas, hectorite clays, or bentonite clays. Such materials are usually used at levels of less than 10% based on the total solid weight of reactants. Rheology control agents are used to control the flow and leveling of the composition during application and curing steps. The rheology control agent is also useful for controlling the metallic appearance of the coating. Such materials may help "fix" the pigment flake surface in an alignment parallel to the surface of the coating to maximize the interleafing of the Al flakes in the instant invention.

The thickener gel comprises a swellable clay, molecular sieve product and solvents. Examples of swellable clay include but are not limited to Claytone 40 (Southern Clay Products, Inc. (Gonzales, Tex.) and Bentone 34 (NL Industries, Houston, Tex.). Claytone 40 is a tan solid powder comprising crystalline silica; quaternary ammonium compounds, bis (hydrogenated tallow alkyl) dimethyl-, salt with bentonite; and ammonium montmorillonite. Montmorillonite has the formula of $Al_2O_2.4SiO_2.H_2O$. Bentonite is a colloidal native hydrated aluminum silicate clay which consists principally of montmorillonite. It usually contains some magnesium, iron and calcium carbonate. Bentonite has the property of forming highly viscous suspensions or gels with not less than ten times its weight of water and also emulsifies oils.

The molecular sieve, or zeolite, is a member of a family of hydrous Al silicate materials whose atoms enclose sodium, potassium, calcium, strontium and barium. They are chiefly used as molecular filters, and in this case to absorb water from the swellable clay. One example of a suitable zeolite is Baylith L powder (A.B. Colby, McMurray, Pa.), which is sold in active, water-free form. The product is a moisture scavenger for coating systems. UOP (AB Colby, Inc.) also makes a comparable zeolite.

Organic solvents are used in both the thickener gel and in the final formulation. Examples include xylene and isobutyl acetate. In lieu of isobutyl acetate, several other slow-drying, polar solvents such as n-butyl acetate, methyl isobutyl ketone (MIBK), methyl n-butyl ketone (MNBK), monoether ethylene glycol acetate (EE Acetate), cellosolve acetate, propyleneglycol methyl ether acetate (PM acetate) can be used. Additional cosolvents may be added to aid in stabilization or application of the composition. Other solvents are acetates such as hexyl acetate, octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Toluene can be used to replace all or part of the xylene, although the applied paint may dry faster with toluene.

EXAMPLES

Example 1

The paint needs to be mixed and stored under a dry atmosphere, such as nitrogen or air, to avoid the absorption of water, which inactivates isocyanates, and to avoid oxidation of the Al-flake pigment. First, a thickener gel or binder is prepared with 1 kg Claytone 40 (Southern Clay Products), and 1 kg 4A molecular sieve (such as Baylith L powder, AB Colby). These compounds are mixed and combined with about 8.5 kg of solvent, which is divided between xylene and isobutyl acetate.

Next 11 kg of binder is added to 25.5 kg of solvent, divided between xylene and isobutyl acetate and 18.5 kg of non-leafing aluminum flake paste. Finally, 55 kg of Desmodur E-28 (Bayer) is added and mixed until smooth. Care should be taken not to overdisperse the flakes, or they may lose their flatness. The paint provided good coverage.

Example 2

The same mixture was prepared, except that leafing aluminum flake paste was used. A test surface was coated with the paint and allowed to dry. When the painted test surface was rubbed, the aluminum flaked off, which was deemed undesirable.

Example 3

In another example, a partially rusted corrugated steel roof (about 75% rust, the remainder retaining some galvanized zinc) was spray coated with two coats of the paint of Example 1. The paint protected the remaining steel and restored the overall appearance at a fraction of the cost of sheet metal replacement.

Example 4

General: Nine coated metal test panels were submitted to the National Testing Standards Inc. (Anaheim, Calif.), along with a tenth, uncoated panel as a control. The test panels were scribed through to the metal substrate and subjected sequentially to a series of environmental exposures. If the coating on a panel exhibited visible degradation, testing of that panel was terminated. The following panels were coated according to the manufacturers' directions:

Panel 1 Rust-Oleum Rusty Metal Primer/Gloss Enamel
Panel 2 Rust Bullet—two layers, no topcoat
Panel 3 Rust-Oleum Rust Reformer/Rust-Oleum Glass Enamel
Panel 4 Zynolyte urethane/Zinc-chromate primer
Panel 5 Rust-Oleum Cold Galvanizing compound
Panel 6 Wasser Brand System
Panel 7 Naval Jelly Rust Neutralizer/Napa Ruf-Nek HD spray paint
Panel 8 POR-15 System/Napa Rud-Nek HD spray paint
Panel 9 Hammerite Rust Cap.

Accelerated Weathering

All test and control panels were exposed to 168 hours of accelerated weathering in an Atlas Weatherometer model 18W type HH (Atlas, Chicago, Ill.). The apparatus and operation were in accordance with the procedures set forth in ASTM G-23. None of the nine test panels exhibited any degradation of the integrity of the coating, while the control panel exhibited light surface rusting.

Thermal Shock

After accelerated weathering, all of the test and control panels were thermal cycled according to ASTM D-2337. The high temperature was 160° F. and the low temperature was −20° F. Two cycles consisting of 3 hours each were performed. None of the exposed coated panels exhibited any visible evidence of coating degradation; however, the control panel exhibited additional surface rusting.

Seawater Spray (Fog)

After thermal cycling all test and control panels were scribed through to the metal substrate and placed in a salt spray/fog chamber for 500 hours (three weeks). The chamber was operated in accordance with the procedures set forth in ASTM B-117, except that actual seawater was used in place of standardized salt water. Panel numbers 2, 5, 6, and 8 exhibited corrosion along the scribe line with undercutting of the paint being less than 3/16 inch. Panel numbers 1, 3, 4, 7 and 9 exhibited coating failure over the entire surface of the panel. These panels were considered complete failures and were eliminated from further testing. The control panel was corroded enough to be of little further value and was also eliminated from further testing.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of protecting a surface, the method comprising
   providing a coating material consisting essentially of polyisocyanates with unreacted, active NCO groups, non-leafing aluminum flakes, xylene, isobutyl acetate, thickener gel and molecular sieve; and
   applying the coating material to a surface,
   thereby protecting the surface with an armor of aluminum.

2. The method of claim 1 wherein the coating material comprises about 3% to about 25% by weight of aluminum flakes.

3. The method of claim 1 wherein the coating material comprises about 5% to about 20% by weight of aluminum flakes.

4. The method of claim 1 wherein the coating material comprises about 7% to about 15% by weight of aluminum flakes.

5. The method of claim 1 wherein the provided coating material contains non-leafing aluminum flakes.

6. The method of claim 1 wherein the coated surface is metallic.

7. The method of claim 1 wherein the coated surface is metallic.

8. A method of treating old concrete and rusting rebar, the method comprising
   providing a coating material; consisting essentially of polyisocyanates with unreacted, active NCO groups, non-leafing aluminum flakes, xylene, isobutyl acetate, thickener gel end molecular sieve; and
   applying the coating material to the surfaces of damaged concrete and exposed rebar,
   thereby protecting the surfaces with an armor of aluminum.

9. A method of restoring bridges whose zinc chromate paint needs to be repaired, the method comprising
   providing a coating material consisting essentially of polyisocyanates with unreacted, active NCO groups, non-leafing aluminum flakes, xylene, isobutyl acetate, thickener gel and molecular sieve; and
   applying the coating material to the zinc chromate surface,
   thereby protecting the surface with an armor of aluminum.

* * * * *